United States Patent
Kuo et al.

(10) Patent No.: US 9,046,681 B2
(45) Date of Patent: Jun. 2, 2015

(54) ELECTRO-WETTING ELEMENT AND OPERATION METHOD THEREOF, ELECTRO-WETTING DISPLAY DEVICE

(71) Applicant: INDUSTRIAL TECHNOLOGY RESEARCH INSTITUTE, Chutung, Hsinchu (TW)

(72) Inventors: Shu-Wei Kuo, New Taipei (TW); Yi-Chun Liu, Zhudong Township, Hsinchu County (TW); Wei-Yuan Cheng, Zhubei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 14/033,980

(22) Filed: Sep. 23, 2013

(65) Prior Publication Data

US 2014/0168747 A1 Jun. 19, 2014

(30) Foreign Application Priority Data

Dec. 17, 2012 (TW) ............................. 101147730 A (51) Int. Cl.
*G02B 26/00* (2006.01)
(52) U.S. Cl.
CPC .................................. *G02B 26/005* (2013.01)
(58) Field of Classification Search
CPC .. G02B 26/005; G02B 26/004; G02B 26/004; G09G 3/3433; G09G 2300/0426
USPC ......... 359/290, 291, 228, 245, 253, 315, 318, 359/665, 226.3
See application file for complete search history.

(56) References Cited

U.S. PATENT DOCUMENTS

| | | | |
|---|---|---|---|
| 5,700,559 A | 12/1997 | Sheu et al. | |
| 6,629,826 B2 | 10/2003 | Yoon et al. | |
| 7,042,614 B1 | 5/2006 | Benning et al. | |
| 7,548,363 B2 | 6/2009 | Hayes et al. | |
| 7,593,153 B2 | 9/2009 | Choi | |
| 8,035,879 B2 | 10/2011 | Wang et al. | |
| 8,982,444 B2 * | 3/2015 | Lee et al. ...................... | 359/290 |
| 2008/0218444 A1 | 9/2008 | Rosser | |

(Continued)

FOREIGN PATENT DOCUMENTS

| | | |
|---|---|---|
| TW | 200905241 A | 2/2009 |
| TW | 201007321 A1 | 2/2010 |
| TW | 201222508 A | 6/2012 |

(Continued)

OTHER PUBLICATIONS

Taiwan Office Action for Taiwan Application No. 101147730 dated Jun. 23, 2014.

(Continued)

*Primary Examiner* — Tuyen Tra
(74) *Attorney, Agent, or Firm* — Muncy, Geissler, Olds & Lowe, P.C.

(57) ABSTRACT

The disclosure provides an electro-wetting element, including: a first substrate and a second substrate, wherein the first substrate and the second substrate are disposed oppositely; a first electrode formed on the first substrate; a photoreactive layer formed on the first electrode, wherein the photoreactive layer includes a reversible photoreactive material; a second electrode formed on the first substrate or the second substrate; and a polar fluid and a non-polar fluid disposed between the first substrate and the second substrate.

18 Claims, 10 Drawing Sheets

(56) References Cited

U.S. PATENT DOCUMENTS

2012/0243071 A1    9/2012    Lee et al.
2012/0281269 A1    11/2012    Yang et al.

FOREIGN PATENT DOCUMENTS

| WO | WO 2008/146263 | 12/2008 |
| WO | WO 2011/020013 | 2/2011 |
| WO | WO 2011/020020 | 2/2011 |

OTHER PUBLICATIONS

Hayes et al., "Video-speed electronic paper based on electrowetting", Nature, Sep. 25, 2003, pp. 383-385, vol. 425.

Ku et al., "Single-layered multi-color electrowetting display by using ink-jet-printing technology and fluid-motion prediction with simulation", Journal of the SID, 2011, pp. 488-495, vol. 19, No. 7.

Blankenbach et al., "Bistable Electrowetting Displays with High Reflectivity and Large Aperture Ratio", IDW, 2009, pp. 1385-1388.

Isaksson, et al., "A solid-State Organic Electronic Wettability Switch", Adv. Mater, Feb. 17, 2004, pp. 316-320, vol. 16, No. 4.

Rosario et al., "Lotus Effect Amplifies Light-Induced Contact Angle Switching", J. Phys. Chem. B, Jul. 29, 2004, pp. 12640-12642, vol. 108.

Athanassiou et al., "Combination of microstructuring and laser-light irradiation for the reversible wettability of photosensitised polymer surfaces", Applied Physics A Materials Science & Processing, Mar. 4, 2006, pp. 351-356, vol. 83.

Miyauchi et al., "Reversible wettability control of TiO2 surface by light irradiation", Surface Science, 2002, pp. 401-407, vol. 511.

Feng et al., "Reversible Super-hydrophobivity to Super-hydrophilicity Transition of Aligned Zno Nanorod Films", J. AM. Chem. Soc., Dec. 11, 2003, pp. 62-63, vol. 126.

Caputo et al., "Reversibly Light-Switchable Wettability of Hybrid Organic/ Inorganic Surfaces With Dual Micro-/ Nanoscale Roughness", Adv. Funct. Mater., 2009, pp. 1149-1157, vol. 19.

\* cited by examiner

ELECTRO-WETTING ELEMENT AND OPERATION METHOD THEREOF, ELECTRO-WETTING DISPLAY DEVICE

CROSS REFERENCE TO RELATED APPLICATIONS

This Application claims priority from Taiwan Patent Application Serial No. 101147730, filed on Dec. 17, 2012, the entirety of which is incorporated by reference herein.

TECHNICAL FIELD

The present disclosure relates to an electro-wetting element and operation method thereof, and an electro-wetting display device.

BACKGROUND

Along with developments in photoelectric techniques, electro-wetting displays have been disclosed, having high contrast ratio, fast response time, low power consumption, and high resolution characteristics.

The Liquavista Company manufactures an electro-wetting display. The electro-wetting display comprises a substrate, a non-polar oil, a polar solution, a hydrophobic layer, and a hydrophilic rib, wherein the hydrophobic layer is formed on the substrate, the non-polar oil is formed on the hydrophobic layer and is separated by the hydrophilic rib, and the polar solution is disposed on the non-polar oil. Operation of the electro-wetting display is as follows. When no voltage is applied to the display, the non-polar oil is formed on the hydrophobic layer, so that the color displayed is that of the non-polar oil. When a voltage is applied to the display, the polar solution is attracted by the induced charges formed on hydrophobic layer, and the non-polar oil moves to one corner of the substrate, so that the color of the substrate is displayed.

SUMMARY

One embodiment of the disclosure provides an electro-wetting element, comprising: a first substrate and a second substrate, wherein the first substrate and the second substrate are disposed oppositely; a first electrode formed on the first substrate; a photoreactive layer formed on the first electrode, wherein the photoreactive layer comprises a reversible photoreactive material; a second electrode formed on the first substrate or the second substrate; and a polar fluid and a non-polar fluid disposed between the first substrate and the second substrate.

One embodiment of the disclosure also provides an electro-wetting display device, comprising: a first substrate and a second substrate, wherein the first substrate and the second substrate are disposed oppositely; a first electrode formed on the first substrate; a photoreactive layer formed on the first electrode, wherein the photoreactive layer comprises a reversible photoreactive material, and the photoreactive layer comprises a first portion and a second portion, wherein the water contact angle of the first portion is smaller than that of the second portion; at least one rib formed on the photoreactive layer; a second electrode formed on the first substrate or the second substrate; and a polar fluid and a non-polar fluid disposed between the first substrate and the second substrate.

One embodiment of the disclosure also provides an operation method for the electro-wetting element, comprising: providing an electro-wetting element as disclosed in the disclosure, wherein the photoreactive layer is covered by the non-polar fluid while no voltage is applied to present a first optical state and to form a first stable state; applying a voltage to the electro-wetting element, wherein the non-polar fluid shrinks in one side of the electro-wetting element and the photoreactive layer is covered by the polar fluid to present a second optical state; irradiating the electro-wetting element with a first light source; and removing the voltage, wherein the electro-wetting element remains in the second optical state to form the second stable state.

A detailed description is given in the following embodiments with reference to the accompanying drawings.

BRIEF DESCRIPTION OF THE DRAWING

For a more complete understanding of the present disclosure, reference is now made to the following descriptions taken in conjunction with the accompanying drawings, in which.

DETAILED DESCRIPTION

The following description is of the embodiments of carrying out the disclosure. This description is made for the purpose of illustrating the general principles of the disclosure and should not be taken in a limiting sense. The scope of the disclosure is determined by reference to the appended claims.

Figure 1A:
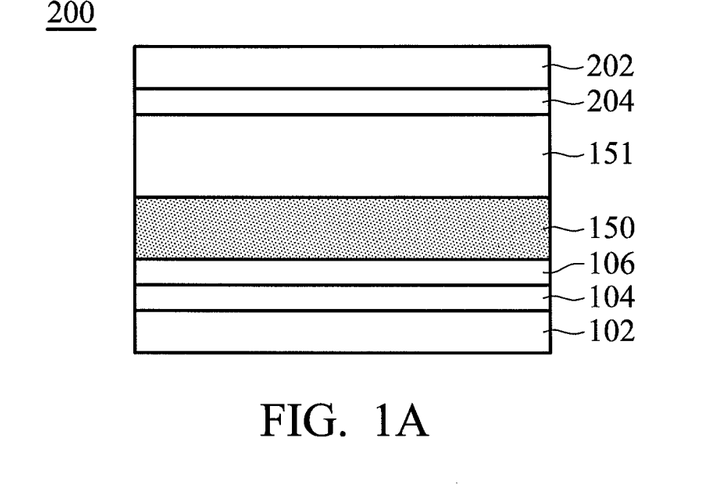
FIG. 1A-1C show a series of cross-sectional schematic representations of an electro-wetting element of one embodiment of the disclosure.

FIG. 1A shows a cross-sectional schematic representation of an electro-wetting element 200 of one embodiment. The electro-wetting element 200 comprises a first substrate 102 and a second substrate 202, wherein the first substrate 102 and the second substrate 202 are disposed oppositely; a first electrode 104 formed on the first substrate 102; a photoreactive layer 106 formed on the first electrode 104; a second electrode 204 formed on the second substrate 202; and a non-polar fluid 150 and a polar fluid 151 disposed between the first substrate 102 and the second substrate 202.

The first substrate 102 and the second substrate 202 independently comprise glass, polymer substrate, or metal. In one embodiment, the first substrate 102 and second substrate 202 are flexible substrates, such as poly(ethylene terephthalate) (PET), polyethylene naphthalate (PEN), polycarbonate (PC), polyethersulfone (PES) or polyimide (PI).

The first electrode 104 is formed on the first substrate 102. The first electrode 104 comprises metal or oxide, such as alumina (Al), silver (Ag), indium tin oxide (ITO), molybdenum tungsten (MoW), or indium zinc oxide (IZO).

The second electrode 204 is formed on the second substrate 202. The material of the second electrode 204 may be the same as that of the first electrode 104, and thus is omitted herein.

alkyl group or $NO_2$, $R_2$ comprises C1-C18 alkyl group, hydroxyl group, alkyl ester or alkyl amine) are doped into polystyrene (PS) to form a mixture. The mixture is coated on the substrate to form the photoreactive layer 106.

Scheme 1

The non-polar fluid 150 comprises silicon oil, $C_{10}$~$C_{16}$ alkene or combinations thereof. The $C_{10}$~$C_{16}$ alkene comprises decane, dodecane, tetradecane, or hexadecane. In one embodiment, the non-polar fluid 150 further comprises a dye or a pigment.

The polar fluid 151 comprises water, aqueous solution, or ethanol. An electrolyte may be added to the polar fluid 151 to increase the ionic conductivity. The electrolyte comprises potassium chloride (KCl) or sodium chloride (NaCl). The polar fluid 151 and the non-polar fluid 150 do not dissolve in each other.

The photoreactive layer 106 comprises a reversible photoreactive material, such as spiropyran compound, spiropyran derivative, azobenzene compound, azobenzene derivative, diphenyl ethylene derivative, $TiO_2$ or ZnO. The water contact angle of the photoreactive layer 106 has a reversible change while being irradiated by a light source, and the reversible change is about 10-90 degrees.

In one embodiment, in addition to the reversible photoreactive material, the photoreactive layer 106 further comprises a modifier. The modifier comprises polystyrene (PS), polymethyl methacrylate (PMMA), hydroxylethyl methacrylate (HEMA), or combinations thereof.

The coating ability of the reversible photoreactive material is increased by adding the modifier. A coating method comprises spin coating, slit or slot die coating, blade coating, gravure printing, or dip coating method. Additionally, the hydrophilic property or the hydrophilic property of the reversible photoreactive material may be adjusted by the modifier to optimize the water contact angle of the photoreactive layer 106.

In one embodiment, the reversible photoreactive material of the photoreactive layer 106 is formed on the first electrode 104 by a self-assembly (SAM) method. Alternatively, the reversible photoreactive material of the photoreactive layer 106 is formed on the first electrode 104 by doping or co-polymerizing with a non-photoreactive material. The hydrophilic or the hydrophilic property of the photoreactive material may be adjusted by the non-photoreactive material. The non-photoreactive material and the spiropyran derivate are formed on the first electrode 104 by the self-assembly (SAM) method to form the photoreactive layer 106 and the water contact angle of the photoreactive layer 106 is further optimized.

In one embodiment, when spiropyran compound is used as the photoreactive material, the non-photoreactive material may have an alkyl group, cycloalkyl group, phenyl group, naphthol group, or combinations thereof.

In one embodiment, spiropyran compound (chemical structure as shown in scheme 1, and $R_1$ comprises H, $C_1$-$C_5$ The photoreactive layer 106 is hydrophobic before irradiation by the light source, and the water contact angle of the photoreactive layer 106 is larger than about 100 degrees. Thus, the non-polar fluid 150 is likely to cover the photoreactive layer 106.

Figure 1B:
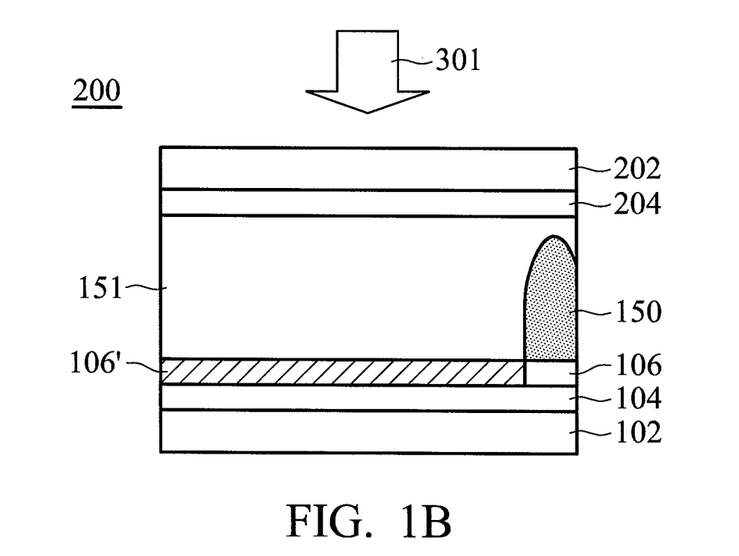

Referring to FIG. 1B, when a voltage or an electrical field is applied to the electro-wetting element 200, the non-polar fluid 150 may shrink to one side of the electro-wetting element 200. Meanwhile, the electro-wetting element 200 is irradiated by a first light source 301, and a hydrophilic photoreactive layer 106' is formed from the hydrophobic photoreactive layer 106. The water contact angle of the hydrophilic photoreactive layer 106' is smaller than about 90 degrees. Thus, the polar fluid 151 is likely to cover the hydrophilic photoreactive layer 106'. Then, the non-polar fluid 150 still shrinks to one side of the electro-wetting element 200 after removing the voltage. The first light source 301 comprises, but is not limited to, a laser light source, ultra-violet (UV) light source, visible light source, or infrared (IR) light source.

Figure 1C:
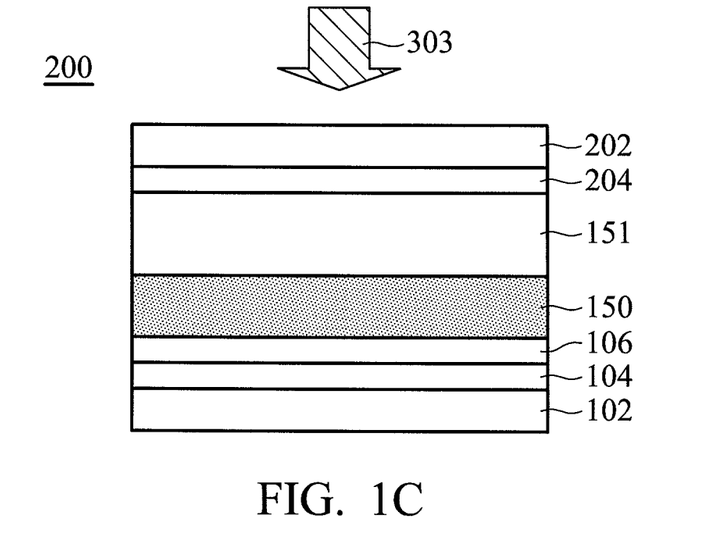

Referring to FIG. 1C, the electro-wetting element 200 is irradiated by a second light source 303, and the hydrophobic photoreactive layer 106 is obtained from the hydrophilic photoreactive layer 106'. Thus, the non-polar fluid 150 is likely to cover the photoreactive layer 106 again. The second light source 303 comprises, but is not limited to, a laser light source, ultra-violet (UV) light source, visible light source, or infrared (IR) light source. The second light source 303 may be a point light source, linear light source, or surface light source and may be performed by a scan method or an overall irradiation method with a patterned mask.

Additionally, the first light source 301 and the second light source 303 may have a different wavelength or energy. For example, the first light source 301 is an ultra-violet (UV) light source, and the second light source 303 is an infrared (IR) light source. The hydrophilic property of the photoreactive layer 106 may be changed to the hydrophilic property, and vice versa.

In one embodiment, the electro-wetting element 200 further comprises a dielectric layer (not shown) formed between the photoreactive layer 106 and the first electrode 104. The dielectric layer comprises silicon oxide, silicon nitride, silicon oxynitride, alumina oxide ($Al_2O_3$), tantalum oxide ($Ta_2O_3$), titanium oxide ($TiO_2$), barium titanium oxide ($BaTiO_3$), polyvinylidene difluoride (PVDF), or combinations thereof.

Figure 2:
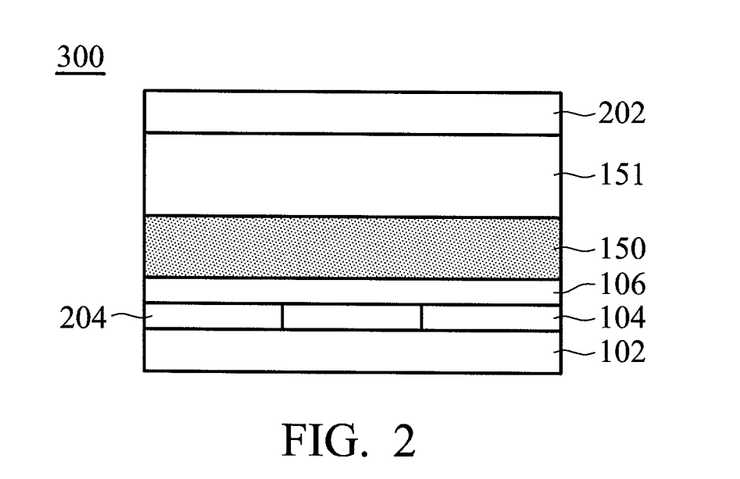
FIG. 2 shows a cross-sectional schematic representation of an electro-wetting element of one embodiment of the disclosure.

FIG. 2 shows a cross-sectional schematic representation of an electro-wetting element 300 of one embodiment. Some structures in FIG. 2 have been omitted for clarity and like elements are identified by the same reference numbers as in FIG. 1A. The difference between FIG. 2 and FIG. 1A is that the second electrode 204 is formed on the first substrate 102 in FIG. 2. In one embodiment, the first electrode 104 and the second electrode 204 may be formed simultaneously at the same fabrication step, and thus fabrication steps and cost are reduced.

Figure 3A:
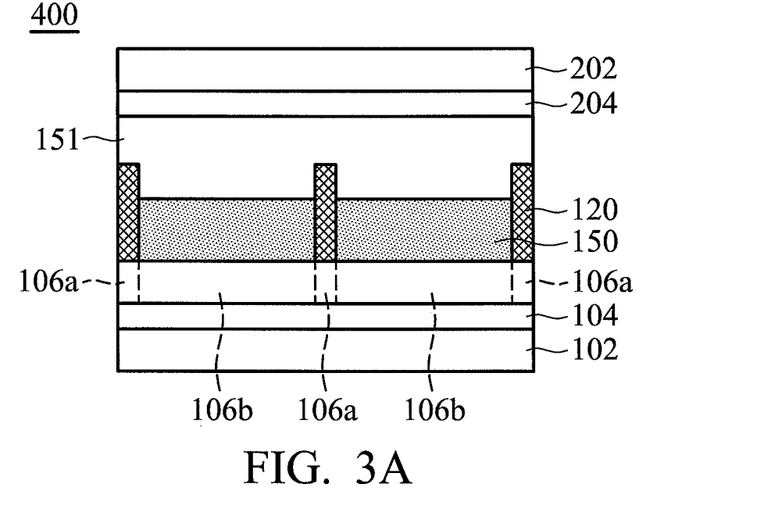
FIG. 3A-3C show a series of cross-sectional schematic representations of an electro-wetting display device of one embodiment of the disclosure.

FIG. 3A shows a cross-sectional schematic representation of an electro-wetting element 400 of another embodiment. Some structures in FIG. 3A have been omitted for clarity and like elements are identified by the same reference numbers as in FIG. 1A. The difference between FIG. 3A and FIG. 1A is that at least one rib 120 is formed on the photoreactive layer 106, and the photoreactive layer 106 comprises a first portion 106a and a second portion 106b. The first portion 106a is formed below the rib 120. The water contact angle of the first portion 106a of the photoreactive layer 106 is smaller than that of the second portion 106b.

In one embodiment, the water contact angle of the first portion 106a of the photoreactive layer 106 is smaller than about 90 degrees, and the water contact angle of the second portion 106b of the photoreactive layer 106 is larger than about 100 degrees. The difference in the water contact angles of the first portion 106a and the second portion 106b is larger than about 30 degrees.

The material of the rib 120 comprises positive resist, negative resist, photosetting resin, or thermosetting resin. The rib 120 is formed by a photolithography process, a molding process, or a screen printing molding process.

For brevity, only three ribs 120 are shown in FIG. 3A. However, the number of the rib 120 may be adjusted according to actual application, and the disclosure is not limited thereto.

The height of the rib 120 is about 2-100 μm, and the shape of the rib 120 may be square, rectangular, triangular, circular, circular, or hexangular when viewed from the second substrate 202.

Figure 3B:
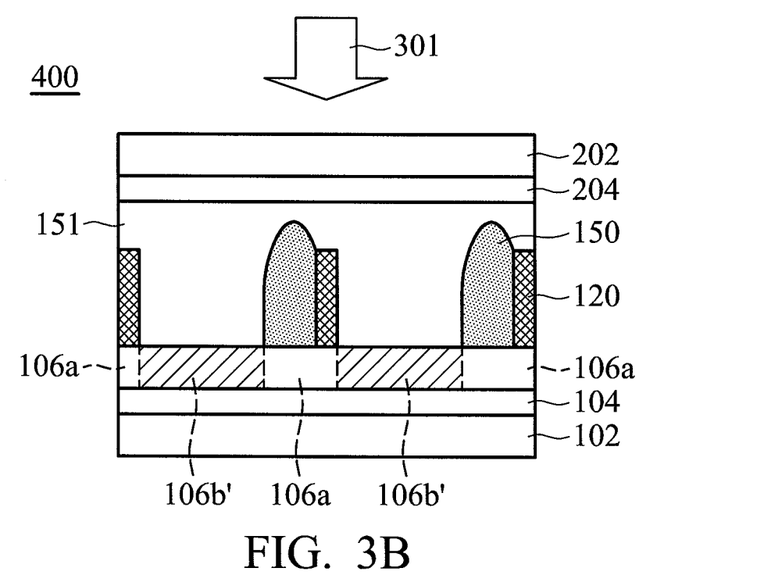

FIG. 3B shows a cross-sectional schematic representation of an electro-wetting element 400 irradiated by a first light source 301. The second portion 106b of the photoreactive layer 106 is changed to hydrophilic, and the water contact angle of the hydrophilic second portion 106b' is smaller than about 90 degrees. Thus, the non-polar fluid 150 shrinks to one side of the rib 120, and the hydrophilic second portion 106b' is covered by the polar fluid 151.

Figure 3C:
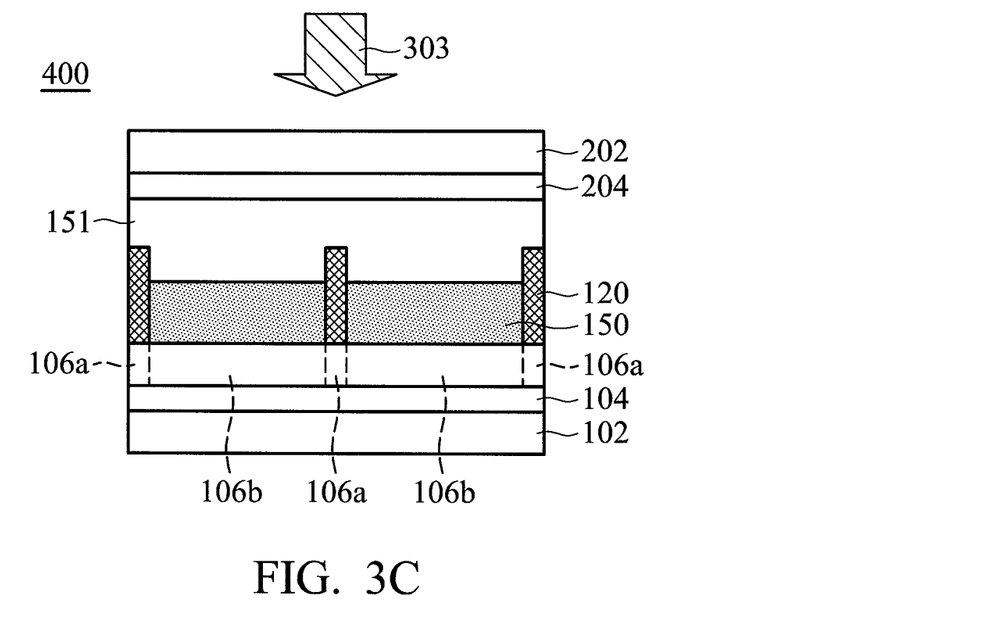

FIG. 3C shows a cross-sectional schematic representation of an electro-wetting element 400 irradiated by a second light source 303. The hydrophilic second portion 106b' is changed to the hydrophobic second portion 106. Thus, the hydrophobic second portion 106b is covered by the non-polar fluid 150.

The second light source 303 comprises, but is not limited to, a laser light source, ultra-violet (UV) light source, visible light source, or infrared (IR) light source. The second light source 303 may be a point light source, linear light source, or surface light source and may be performed by a scan method or an overall irradiation method with a patterned mask.

One embodiment of the disclosure also provides an operation method for the electro-wetting element comprising the following steps. Referring to FIG. 1A again, the electro-wetting element 200 is provided. The photoreactive layer 106 is covered by the non-polar fluid 150 while no voltage is applied to present a first optical state and to form a first stable state.

In one embodiment, the black dye or pigment is added to the non-polar fluid 150, and the polar fluid 151 is a transparent aqueous solution. Thus, the first optical state of the electro-wetting element 200 is black and in a dark state.

Then, referring to FIG. 1B, a voltage is applied to the electro-wetting element 200, the non-polar fluid 150 shrinks in one side of the electro-wetting element 200 and the photoreactive layer 106 is covered by the polar fluid 151 to present a second optical state (such as transparent).

Next, the electro-wetting element 200 is irradiated by a first light source 301. Then, the voltage is removed, and the electro-wetting element 200 remains in the second optical state to form the second stable state. Note that after the voltage is removed, the hydrophobic photoreactive layer 106 is changed to a hydrophilic photoreactive layer 106'. The water contact angle of the hydrophilic photoreactive layer 106' is smaller than about 90 degrees. Thus, the polar fluid 151 is likely to cover the hydrophilic photoreactive layer 106'. Thus, the electro-wetting element 200 remains in the second stable state, and shows a bi-stable state.

Then, referring to FIG. 1C, the electro-wetting element 200 is irradiated by a second light source 303, and the electro-wetting element 200 is back to the first stable state. The hydrophobic photoreactive layer 106 is obtained from the hydrophilic photoreactive layer 106'. Thus, the water contact angle of the hydrophobic photoreactive layer 106 is larger than about 100 degrees.

The first light source 301 and the second light source 303 may have a different wavelength or energy. For example, the first light source 301 is an ultra-violet (UV) light source, and the second light source 303 is an infrared (IR) light source. The hydrophilic property of the photoreactive layer 106 may be changed to a hydrophilic property, and vice versa.

Furthermore, the area of the photoreactive layer 106 covered by the non-polar fluid 150 varies with the voltage applied between the first optical state and the second optical state. The multi-stable state may be obtained by increasing the numbers of the stable states.

FIG. 4A-4G show a series of cross-sectional schematic representations of an electro-wetting element 500 having four stable states in one embodiment. An area of the photoreactive layer 106 covered by the non-polar fluid 150 varies with three different applied voltages (V1, V2, V3, V1<V2<V3). The area of the photoreactive layer 106 covered by the non-polar fluid 150 is decreased with the increased voltage applied.

Figure 4A:
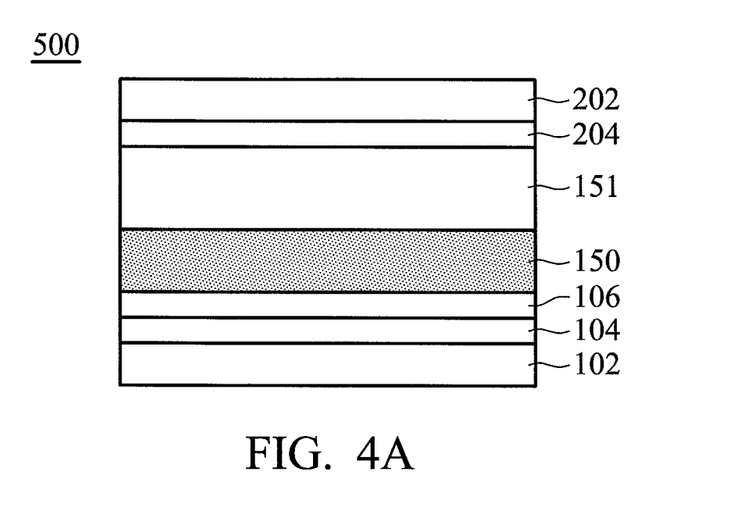
FIG. 4A-4G show a series of cross-sectional schematic representations of an electro-wetting element having four stable states of one embodiment of the disclosure.

Referring to FIG. 4A, the electro-wetting element 500 is provided. The photoreactive layer 106 is covered by the non-polar fluid 150 while no voltage is applied to present a first optical state and to form a first stable state.

Figure 4B:
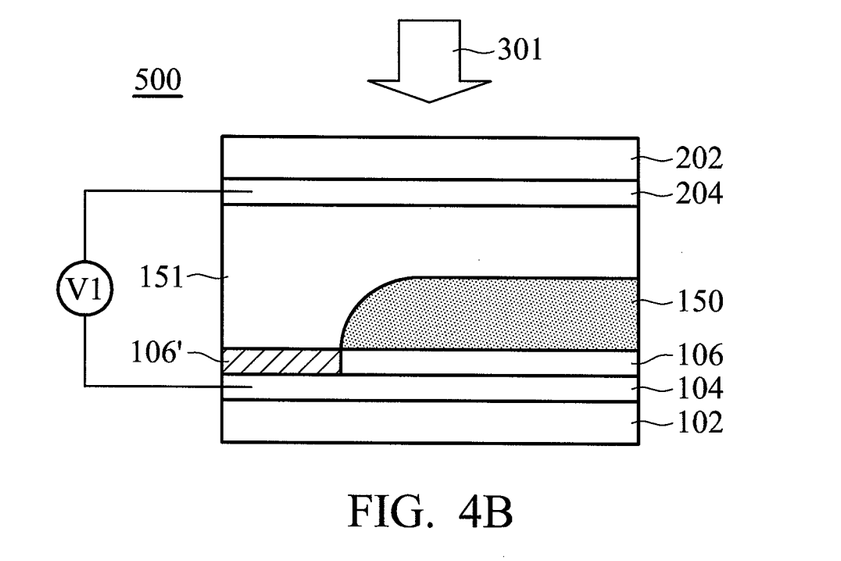

Referring to FIG. 4B, a first voltage V1 is applied to the electro-wetting element 500, the non-polar fluid 150 shrinks in one side of the electro-wetting element 500 and the photoreactive layer 106 is covered by the polar fluid 151 to present a second optical state (such as transparent). Next, the electro-wetting element 500 is irradiated by a first light source 301.

Figure 4C:
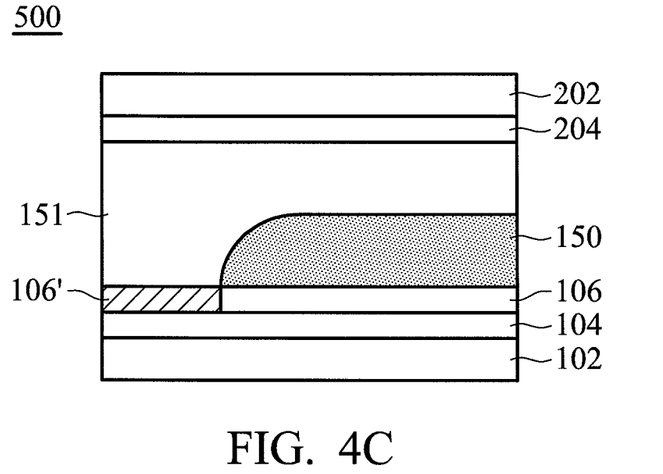

Referring to FIG. 4C, the first voltage V1 and the first light source 301 are removed. The electro-wetting element 500 remains in the second optical state to form a second stable state.

Figure 4D:
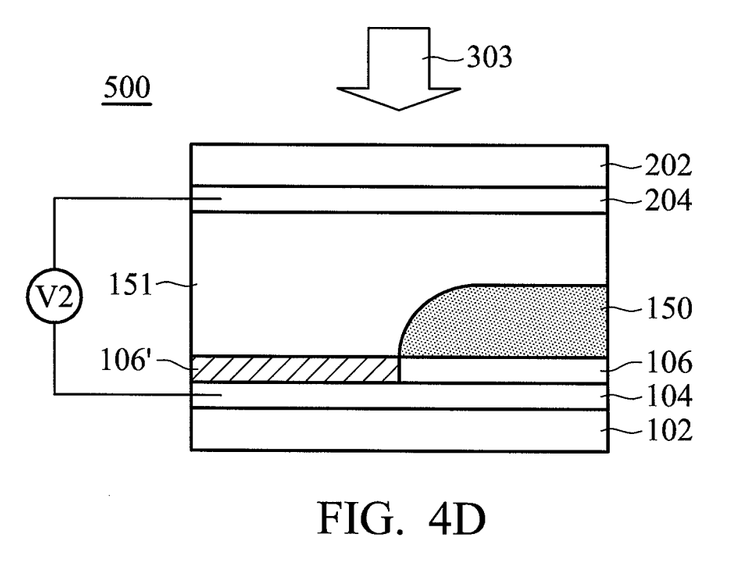

Referring to FIG. 4D, a second voltage V2 (V2>V1) is applied to the electro-wetting element 500, the area of the photoreactive layer 106 covered by the non-polar fluid 150 is decreased to form a third optical state. Next, the electro-wetting element 500 is irradiated by a second light source 303.

Figure 4E:
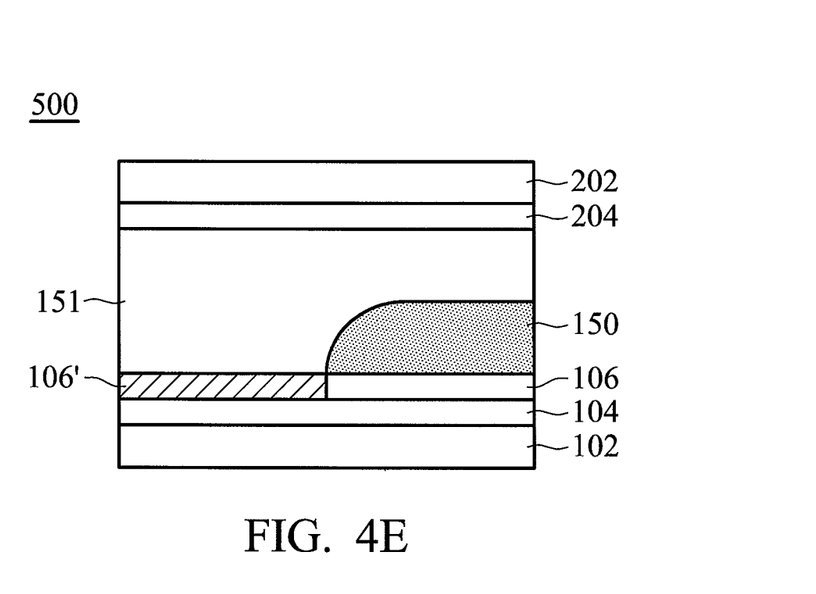

Referring to FIG. 4E, the second voltage V2 and the second light source 303 are removed. The electro-wetting element 500 remains in the third optical state to form a third stable state.

Figure 4F:
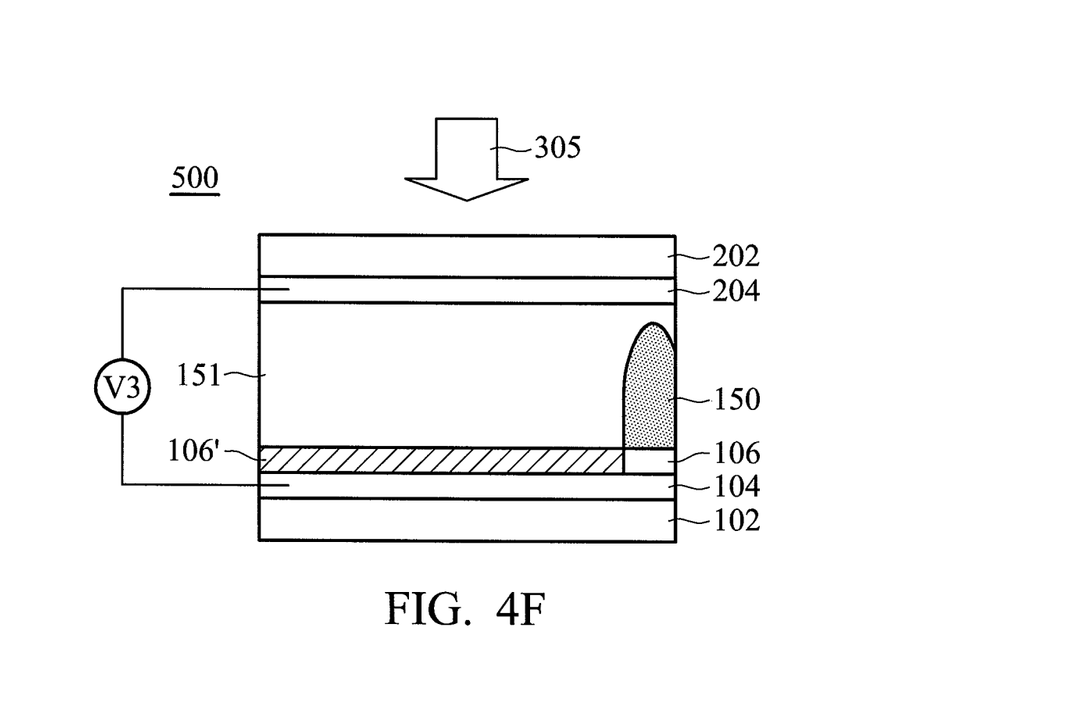

Referring to FIG. 4F, a third voltage V3 (V3>V2) is applied to the electro-wetting element 500, the area of the photoreactive layer 106 covered by the non-polar fluid 150 is further decreased to form a fourth optical state. Next, the electro-wetting element 500 is irradiated by a third light source 305. The first light source 301, the second light source 303, and the third light source 305 independently have the same or different wavelengths.

Figure 4G:
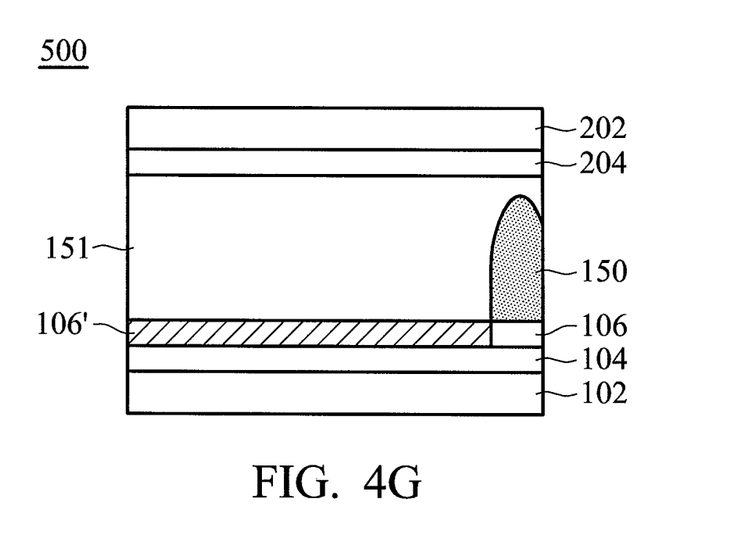

Referring FIG. 4G, the third voltage V3 and the third light source 305 are removed. The electro-wetting element 500 remains in the fourth optical state to form a fourth stable state.

The area of the photoreactive layer 106 covered by the non-polar fluid 150 may be increased by applying a larger voltage. Conversely, if a small area of the photoreactive layer 106 covered by the non-polar fluid 150 is changed to a large area, the electro-wetting element 500 may first be irradiated by the second light source 303. Then, the electro-wetting element 500 is back to the first stable state, and then restarts again.

In actual application, when the electro-wetting display device has a thin-film transistor (TFT) element, the specific region of the TFT element may be driven by applying voltage, and the oil shrinks in the specific region to expose the photoreactive layer. Then, the entire electro-wetting display device was irradiated. The hydrophobic photoreactive layer is changed to a hydrophilic photoreactive layer. When the voltage is removed, the oil remains in the shrunken state to obtain a bi-stable picture/image.

In another embodiment, when the electro-wetting display device has no thin-film transistor (TFT) element, the entire electro-wetting display device is first irradiated. The oil shrinks in a pixel region to expose the photoreactive layer. Then, the specific region is irradiated by a light source using a patterned mask. The hydrophobic photoreactive layer exposed by the light source is changed to a hydrophilic photoreactive layer. The oil remains in the shrunken state to obtain a bi-stable picture/image.

The specific region may be irradiated by a light source using a patterned mask, or by using an addressing scan. The patterned mask may be a fixed patterned mask (such as metal mask, photographic mask) or a variable mask (for example, a variable mask is provided to polymer dispersed liquid crystal (PDLC), super twisted nematic liquid crystal display (STN LCD) or EWD).

From the above descriptions, the embodiment of the disclosure provides an electro-wetting element and operation method thereof, and an electro-wetting display device, wherein the hydrophobic or hydrophilic photoreactive layer may be changed by irradiating a light source to obtain a bi-state or multi-state display.

EXAMPLE

Example 1

15 wt % of spiropyran compound (chemical structure is shown in Scheme 1, and $R_1$ is $NO_2$, $R_2$ is $C_3H_7$) was doped in 100 g of polymethylmethacrylate (PMMA) (molecular weight: 100 k) to form a mixture. The mixture was coated on a substrate by a spin coating method to form 200 nm of the photoreactive layer (300 rpm for 20 seconds).

When the photoreactive layer was exposed to an ultra-violet light with an accumulated energy of 3 Joules (DNS PA-1500 machine, ultra-violet light wavelength is about 248-380 nm with an average energy about 24 mW/cm$^2$), the majority of the spiropyran compound changed from a close form to an open form. Thus, the hydrophobic photoreactive layer (water contact angle of 102.6 degrees) was changed to a hydrophilic photoreactive layer (water contact angle of 24.7 degrees).

When the hydrophilic photoreactive layer was exposed to a green light with an accumulated energy of 4 Joules (green light wavelength is about 520-570 nm), the spiropyran compound recovered to the close form. Thus, the hydrophilic photoreactive layer was changed to a hydrophobic photoreactive layer.

Example 2

20 wt % of spiropyran compound (chemical structure is shown in Scheme 1, and $R_1$ is $NO_2$, $R_2$ is $C_{18}H_{37}$) was doped in 100 g of polystyrene (PS) (molecular weight: 100 k) to form a mixture. The mixture was coated on a substrate by a spin coating method to form 100 nm of the photoreactive layer (300 rpm for 20 seconds).

When the photoreactive layer was exposed to an ultra-violet light with an accumulated energy of 3 Joules, the majority of the spiropyran compound was changed from a close form to an open form. Thus, the hydrophobic photoreactive layer (water contact angle of 105.6 degrees) was changed to a hydrophilic photoreactive layer (water contact angle of 20.1 degrees).

When the hydrophilic photoreactive layer was exposed to a green light with an accumulated energy of 4 Joules, the spiropyran compound recovered to the close form. Thus, the hydrophilic photoreactive layer was changed to a hydrophobic photoreactive layer.

Example 3

20 wt % of spiropyran compound (chemical structure is shown in Scheme 1, and $R_1$ is $NO_2$, $R_2$ is $C_{18}H_{37}$) was doped in 100 g of polyvinylidene difluoride (PVDF) (molecular weight: 100 k) to form a mixture. The mixture was coated on a substrate by a spin coating method to form 100 nm of the photoreactive layer (300 rpm for 20 seconds).

Scheme 1 close form    open form

When the photoreactive layer was exposed to an ultra-violet light with an accumulated energy of 3 Joules, the majority of the spiropyran compound was changed from a close form to an open form. Thus, the hydrophobic photoreactive layer (water contact angle of 102.6 degrees) was changed to a hydrophilic photoreactive layer (water contact angle of 24.1 degrees).

When the hydrophilic photoreactive layer was exposed to a green light with an accumulated energy of 4 Joules, the spiropyran compound recovered to the close form. Thus, the hydrophilic photoreactive layer was changed to a hydrophobic photoreactive layer.

Example 4

20 wt % of spiropyran compound (chemical structure is shown in Scheme 1, and $R_1$ is $NO_2$, $R_2$ is $C_{18}H_{37}$) and 5 wt % of $TiO_2$ was doped in 100 g of polyvinylidene difluoride (PVDF) (molecular weight: 100 k) and 25 g of polymethyl-methacrylate (PMMA) to form a semi-transparent mixture. The semi-transparent mixture was coated on a substrate by a spin coating method to form 90 nm of the photoreactive layer (300 rpm for 20 seconds).

When the photoreactive layer was exposed to an ultra-violet light with an accumulated energy of 3 Joules, the majority of the spiropyran compound changed from a close form to an open form. Thus, the hydrophobic photoreactive layer (water contact angle of 102.5 degrees) was changed to hydrophilic photoreactive layer (water contact angle of 21.1 degrees).

When the hydrophilic photoreactive layer was exposed to a green light with an accumulated energy of 4 Joules, the spiropyran compound recovered to the close form. Thus, the hydrophilic photoreactive layer was changed to a hydrophobic photoreactive layer.

Example 5

Fabricating an Electro-Wetting Display Device

The photoreactive layer of Example 1-4 was formed on a first substrate or a first substrate with a dielectric layer. A rib formed by a photolithography process was formed on the photoreactive layer to define at least one pixel region. The rib preferably had a hydrophilic property.

Then, a non-polar fluid (such as a mixture of tetradecane and hexadecane) was coated on the first substrate with the photoreactive layer.

Next, the first substrate with the non-polar fluid was dipped into a polar fluid (such as aqueous solution).

Then, a second substrate was provided. A sealing strip was formed along an edge of the second substrate. The second substrate was also put into the polar fluid and disposed oppositely to the first substrate. The polar fluid and the non-polar fluid were formed between the first substrate and the second substrate, and the sealing strip was used to adhere the first substrate and the second substrate to form the electro-wetting display device.

Example 6

The photoreactive layer was exposed by a continuous wavelength light source (such as Example 1-4) or by a specific wavelength light source which had a higher reactivity to the photoreactive layer. The overall exposure amount to the photoreactive layer may be reduced by using the specific wavelength light source, and the reliability of the electro-wetting display device may be increased further.

30 wt % of spiropyran compound (chemical structure is shown in Scheme 1, and $R_1$ is $NO_2$, $R_2$ is $C_{18}H_{37}$) was doped in 100 g of polystyrene (PS) (molecular weight: 100 k) to form a mixture. The mixture was coated on a substrate by a spin coating method to form 90 nm of a photoreactive layer (300 rpm for 15 seconds).

Figure 5A:
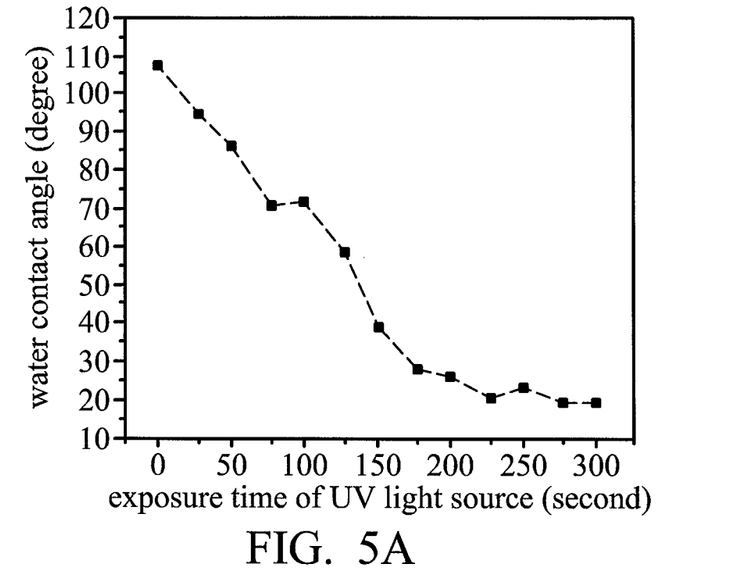
FIG. 5A shows the relationship between the exposure time of the ultra-violet light source and the water contact angle of the photoreactive layer.

FIG. 5A shows the relationship between the exposure time of the ultra-violet light source and the water contact angle of the photoreactive layer. The DNS PA-1500 machine was used, the ultra-violet light wavelength was about 248-380 nm with an average energy about 24 mJ.

After irradiation by the ultra-violet light for 200 seconds, the majority of the spiropyran compound changed from a close form to an open form. Thus, the hydrophobic photoreactive layer (water contact angle of 107.3 degrees) was changed to a hydrophilic photoreactive layer (water contact angle of 21.1 degrees).

Figure 5B:
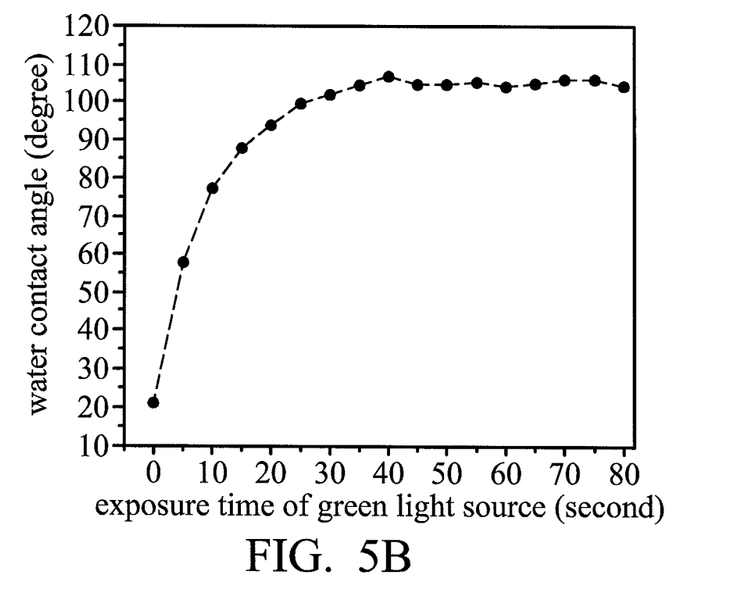
FIG. 5B shows the relationship between the exposure time of the green light source and the water contact angle of the photoreactive layer.

FIG. 5B shows the relationship between the exposure time of the green light source and water contact angle of the photoreactive layer. The green light source was Helium-Neon Laser with a wavelength of about 543 nm and an energy of about 15 mJ.

When the hydrophilic photoreactive layer was exposed to a green light source for 40 seconds, the spiropyran compound recovered to the close form. Thus, the hydrophilic photoreactive layer was changed to a hydrophobic photoreactive layer.

Example 7

Figure 6:
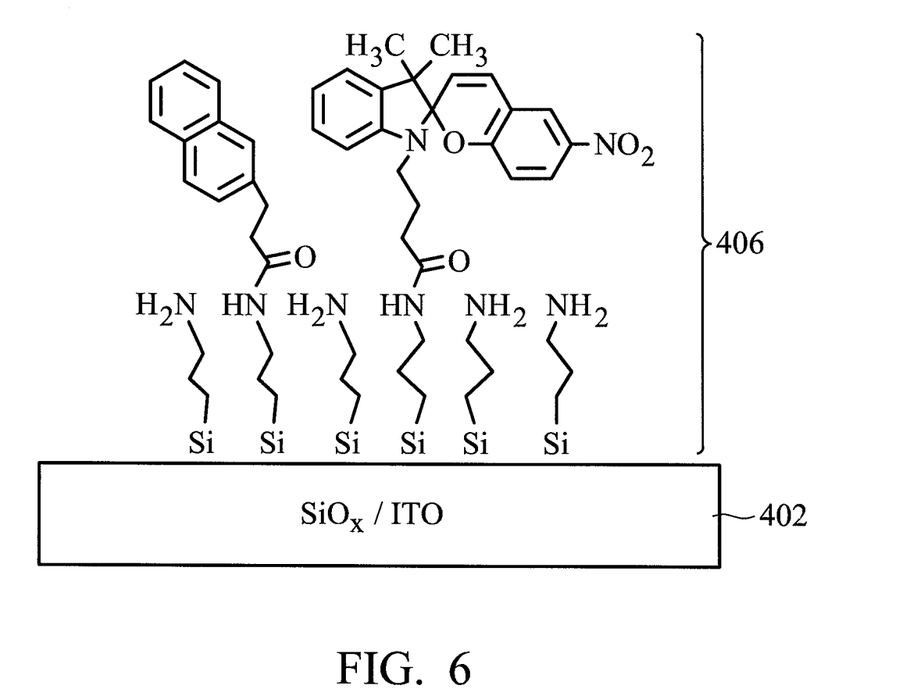
FIG. 6 shows a SiOx/ITO substrate modified with the spiropyran compound of one embodiment of the disclosure.

5% of the 3-aminopropyltriethoxysilane was dissolved in ethanol solution. The 3-aminopropyltriethoxysilane solution was modified on the ITO conductive glass (with a SiOx dielectric layer) by a self-assembly method. The ITO conductive glass was put into a chloroform solution with 3% spiropyran compound (wherein $R_1$ is $NO_2$, $R_2$ is $C_4H_6OCl$) and 1% 2-naphthalene propanoyl chloride. FIG. 6 shows a SiOx/ITO substrate 402 modified with spiropyran compound 406.

When the substrate was exposed to an ultra-violet light with a wavelength of 337 nm, the majority of the spiropyran compound changed from a close form to an open form. Thus, the hydrophobic photoreactive layer (water contact angle of 117.3 degrees) was changed to a hydrophilic photoreactive layer (water contact angle of 27.1 degrees).

When the hydrophilic photoreactive layer was exposed to a green light with a wavelength of 532 nm, the spiropyran compound recovered to the close form. Thus, the hydrophilic photoreactive layer was changed to a hydrophobic photoreactive layer.

While the disclosure has been described by way of example and in terms of the embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An electro-wetting element, comprising:
  a first substrate and a second substrate, wherein the first substrate and the second substrate are disposed oppositely;
  a first electrode formed on the first substrate;

a photoreactive layer formed on the first electrode, wherein the photoreactive layer comprises a reversible photoreactive material and a modifier;

a second electrode formed on the first substrate or the second substrate; and a polar fluid and a non-polar fluid disposed between the first substrate and the second substrate.

2. The electro-wetting element as claimed in claim 1, wherein the water contact angle of the photoreactive layer has a reversible change while being irradiated by a light source.

3. The electro-wetting element as claimed in claim 2, wherein the reversible change is about 10-90 degrees.

4. The electro-wetting element as claimed in claim 1, wherein the reversible photoreactive material comprises spiropyran compound, spiropyran derivative, azobenzene compound, azobenzene derivative, diphenyl ethylene derivative, TiO2, ZnO or combinations thereof.

5. The electro-wetting element as claimed in claim 1, wherein the modifier comprises polystyrene (PS), polymethyl methacrylate (PMMA), hydroxylethyl methacrylate (HEMA) or combinations thereof.

6. The electro-wetting element as claimed in claim 1, wherein the photoreactive layer further comprises a non-photoreactive material.

7. The electro-wetting element as claimed in claim 6, wherein the non-photoreactive material has an alkyl group, cycloalkyl group, phenyl group, naphthol group or combinations thereof.

8. The electro-wetting element as claimed in claim 1, wherein the photoreactive layer has a first water contact angle, and the photoreactive layer has a second water contact angle by irradiation by a first light source, and the second contact angle of the photoreactive layer is changed to the first water contact angle by irradiation with a second light source.

9. The electro-wetting element claimed in claim 8, wherein the second water contact angle is larger than the first water contact angle.

10. An operation method for the electro-wetting element, comprising:
    providing an electro-wetting element as claimed in claim 1, wherein the photoreactive layer is covered by the non-polar fluid while no voltage is applied to present a first optical state and to form a first stable state;
    applying a voltage to the electro-wetting element, wherein the non-polar fluid shrinks in one side of the electro-wetting element and the photoreactive layer is covered by the polar fluid to present a second optical state;
    irradiating the electro-wetting element with a first light source; and
    removing the voltage, wherein the electro-wetting element remains in the second optical state to form a second stable state.

11. The operation method for the electro-wetting element as claimed in claim 10, wherein the first light source comprises a laser light source, ultra-violet (UV) light source, visible light source or infrared (IR) light source.

12. The operation method for the electro-wetting element as claimed in claim 10, after irradiating the electro-wetting element with the first light source, wherein the water contact angle of the photoreactive layer is smaller than about 90 degrees.

13. The operation method for the electro-wetting element as claimed in claim 10, further comprising:
    irradiating the electro-wetting element with a second light source, wherein the electro-wetting element is back to the first stable state after irradiation by the second light source.

14. The operation method for the electro-wetting element as claimed in claim 13, after irradiation by the second light source, wherein the water contact angle of the electro-wetting element is larger than about 100 degrees.

15. The operation method for the electro-wetting element as claimed in claim 13, wherein the first light source is an ultra-violet (UV) light source and the second light source is a visible light source.

16. An electro-wetting display device, comprising:
    a first substrate and a second substrate, wherein the first substrate and the second substrate are disposed oppositely;
    a first electrode formed on the first substrate;
    a photoreactive layer formed on the first electrode, wherein the photoreactive layer comprises a reversible photoreactive material, and the photoreactive layer comprises a first portion and a second portion, wherein the water contact angle of the first portion is smaller than that of the second portion;
    at least one rib formed on the photoreactive layer;
    a second electrode formed on the first substrate or the second substrate; and
    a polar fluid and a non-polar fluid disposed between the first substrate and the second substrate.

17. The electro-wetting display device as claimed in claim 16, wherein the rib is formed on the first portion of the photoreactive layer.

18. The electro-wetting display device as claimed in claim 16, wherein the water contact angle of the photoreactive layer has a reversible change while being irradiated by a light source.

* * * * *